(12) United States Patent
Toda

(10) Patent No.: US 6,496,179 B1
(45) Date of Patent: Dec. 17, 2002

(54) MOVING POSITION DETECTOR

(75) Inventor: Izumi Toda, Chiba (JP)

(73) Assignees: Multidesign Limited, Chiba (JP); Elecom Co., Ltd., Osaka (JP)

( * ) Notice: Subject to any disclaimer, the term of this patent is extended or adjusted under 35 U.S.C. 154(b) by 0 days.

(21) Appl. No.: 09/306,820

(22) Filed: May 7, 1999

(30) Foreign Application Priority Data

May 9, 1998 (JP) .......................................... 10-164100
Apr. 14, 1999 (JP) .......................................... 11-105975

(51) Int. Cl.$^7$ ................................................ G09G 5/08

(52) U.S. Cl. ...................... 345/163; 345/164; 345/156; 345/157

(58) Field of Search ................................ 345/157, 158, 345/160, 163, 156, 164; 74/471 XY

(56) References Cited

U.S. PATENT DOCUMENTS 4,628,755 A  * 12/1986 Hawley ...................... 345/163

* cited by examiner

Primary Examiner—Richard Hjerpe
Assistant Examiner—Duc Q Dinh
(74) Attorney, Agent, or Firm—Swidler Berlin Shereff Friedman, LLP

(57) ABSTRACT

A moving position detector suitable for use as a lightweight, thin mouse. Rotations generated by virtue of frictional forces generated between a bottom of a rotating body and a floor surface are detected by a rotation detecting means as the number of rotations of a rotary encoder portion and converted into an output signal corresponding to the signal from the encoder portion for output to an output means for input into a computer. The rotating body has a pressurizing point for applying loads by gravity or a mechanical element to positions other than a center on the bottom in a direction normal to a moving direction of a mouse relative to the shaft.

8 Claims, 8 Drawing Sheets

MOVING POSITION DETECTOR

BACKGROUND OF THE INVENTION

The present invention relates to a moving position detector for a coordinate input device for moving to an optional location a cursor that is displayed on a display of an information processor unit such as a computer for performing an input operation.

Recently, software has widely been used which uses the GUI (graphical user interface) for inputting data into a computer, and in conjunction with this tendency, also increasingly used as an input unit is a pointing device such as a mouse, joystick, impact tablet, and track ball. In particular, the mouse is practically widely used owing to its excellent operability.

With the recent miniaturization of personal computers and the advent of notebook-sized personal computers, however, a conventional mouse has been found relatively too large and causing inconvenience of carrying and this has given rise to the need of a smaller and thinner mouse.

A conventional mouse uses a normal ball, and the roll of the ball on the floor surface is converted into rotations of a rotary encoder by virtue of a frictional force and the number of rotations of the encoder is then detected for conversion into an output signal to a computer, whereby an input operation is effected.

A method is proposed as used in a conventional position detector for attaining its object without using any ball in which the rotation of a cylindrical rotating body, such as one disclosed in the official gazette of Japanese Patent Publication No. 2554999, Japanese Unexamined Patent Publication (Kokai) No. Sho. 60-225929 or Japanese Unexamined Patent Publication (Kokai) No. Sho. 50-96246, generated by virtue of friction between an outer circumferential (rim) portion of the rotating body and the floor surface is transferred to an encoder where it is converted into rotations thereof, and in which the number of rotations of the encoder is detected and converted for input of a moving FIG. 14 an explanatory view showing an embodiment disclosed in the aforementioned official gazette of Japanese Patent No. 255499. In this embodiment, a rotating body 30 and a rotary encoder 37 are secured to a shaft 33 held by a bearing 32 inclined to an inclination angle at which an outer circumference of the rotating body 30 comes into contact with a floor surface 31 at a single point thereon. In a device disclosed therein, when the bearing 32 is moved in a direction normal to an inclined face of the shaft 33, the rotating body 30 rotates by virtue of friction against the floor surface 31, and the number of rotations of the rotary encoder 37 which rotates as the rotating body rotates is detected by a sensor 38 and the number of rotations so detected is converted into an input signal for use in input. The lack of frictional force at the rotating body 30 is complemented by using an attraction force from an upper ring magnet 35 and a lower ring magnet 36 or any other suitable mechanism. However, a conventional mouse is constructed such that the rotation of a ball is converted into rotations of two shafts disposed in longitudinal and lateral directions so as to be brought into contact with the ball, the rotations so converted are then converted into rotations of an encoder that is fixed to the rotating shafts, and that the number of rotations of the rotary encoder is then detected and converted into a moving distance signal. With this construction, in order to maintain the sensitivity, the ball needs to have a certain weight and be treated so as to have a high friction coefficient on the floor surface thereof, and therefore this poses a limit to efforts to make it lighter in weight and thinner in thickness. In addition, in the case of the conventional ball-type mouse, the diameter of the rotary encoder must be smaller than that of the ball, and therefore when trying to make the ball smaller, there is also encountered a limit to accuracy.

Furthermore, the ball-type mouse has drawbacks that it easily takes up dust on the floor surface or that it suffers slippage or halt in function resulting from it being easily affected by the state of the contact floor surface or dust-containing interior, this leading to a failure in accurate input of data.

On the other hand, in position detectors disclosed in the official gazettes of Japanese Patent No. 2554999 and Japanese Unexamined Patent Publication (Kokai) No. Sho. 60-225929, both examples need to have a bearing for holding inclined rotating body and rotary encoder, and this requires that the mouse needs to have a certain size in a height direction of the rotary encoder and the bearing, this construction also making it unsuitable for the realization of the thinner construction.

Moreover, as to input units other than the mouse, since they provide no intuitive input operation, practice is required to operate them smoothly, thus operational problems being caused by those input units. As to the mouse itself, there have been developed, for instance, mice for effecting signal conversions using no ball but an optical or radio system. They have, however, drawbacks that such a system makes the construction complicated and that a product so designed and manufactured becomes expensive.

SUMMARY OF THE INVENTION

An object of the present invention is to provide a moving position detector suitable for a mouse light in weight and thin in thickness.

Another object of the present invention is to provide a moving position detector suitably for use as a computer mouse that is lightweight in construction and relatively thin compared to a conventional mouse.

The invention described herein relates to a moving position detector for a coordinate input device for use in inputting a position on a display of a display device for an information processor unit comprising a rotating body adapted to rotate around a shaft normal to a floor surface, having a shaft identical to the shaft and placed such that a bottom thereof is brought into contact with the floor surface and having a pressurizing point for applying a load to a location other than the center of the bottom by gravity or by means of a mechanism element, a rotary encoder portion adapted to rotate together with the rotating body, a rotation detecting means for detecting the number of rotations of the rotary encoder portion and an output means for outputting a signal corresponding to an output from the rotation detecting means.

Another aspect of the present invention relates to the invention as set forth in herein, further comprising a pair of rotating bodies, wherein pressurizing points of the rotating bodies are disposed on the floor surface, when operated, at positions normal to each other such that one of the pressurizing points is disposed in a longitudinal direction relative to shafts while the other is disposed in a lateral direction.

In one embodiment, a lever is used to pressurize the pressurizing point so that there is caused difference in pressure at points (4a, 4b, 4c, respectively) on the bottom of the rotating body. A friction-reducing roller is provided on the lever at a portion corresponding to the pressurizing point so as to reduce friction at the pressurizing point.

In another embodiment, a ball is used to pressurize the pressurizing point so as to press the rotating body down against the pressurizing point by gravity while rotating at a certain position.

In another embodiment, a magnet and a ring are used to pressurize the pressurizing point so as to generate a force to press down the rotating body by virtue of attracting forces of the magnet and ring.

The rotating body and the rotary encoder fixed to the shaft are held by either a bearing on a lower plate of a main body or a bearing on an upper plate of the main body, with the rotating body being brought into contact to the floor surface at the bottom thereof With any of the above embodiments, when the lower plate of the main body is placed on the floor surface, the bottom of the rotating body comes into contact with the floor surface. Applied to the points (4a, 4b, 4c) on the bottom are pressures produced by the gravity of the rotating body and the rotary encoder and applied from the pressurizing point. At this moment, although the pressure from the gravity is uniform, due to the pressure from the pressurizing point, the pressure applied to the point (4a) close to the pressurizing point becomes greater than the pressure applied to the point (4b) close to the shaft, and the pressure applied to the point 4c far away from the pressurizing point becomes lower. Due to this, when the shaft is moved in a direction normal to a line connecting the shaft to the pressurizing point, there is caused a difference in frictional force at the points (4a and 4c) with a frictional force at the point (4b) being intermediate between those at the points (4a and 4c), whereby the rotating body is allowed to rotate by virtue of a moment produced by such a difference in frictional force.

The rotation of the rotating body so produced is then eventually detected by the rotation detection means and a signal is outputted from the output means to the computer, thus a position input being effected.

DETAILED DESCRIPTION OF THE PREFERRED EMBODIMENTS

Figure 1A:
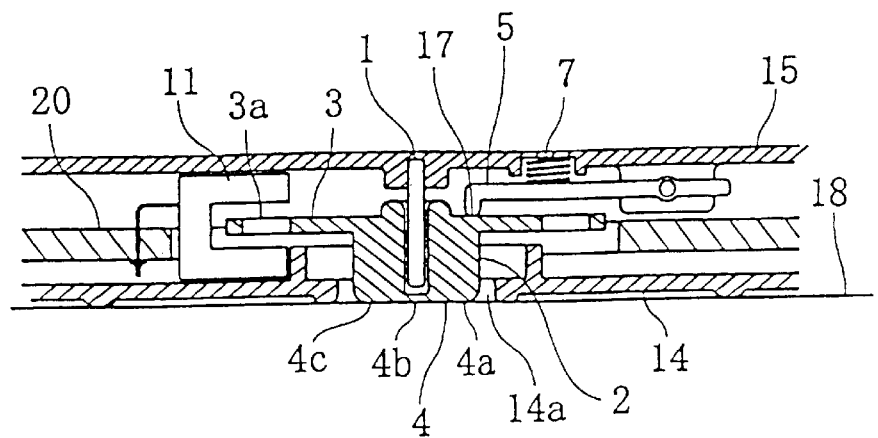
FIG. 1A is a sectional view showing a preferred embodiment of the present invention.
Figure 1B:
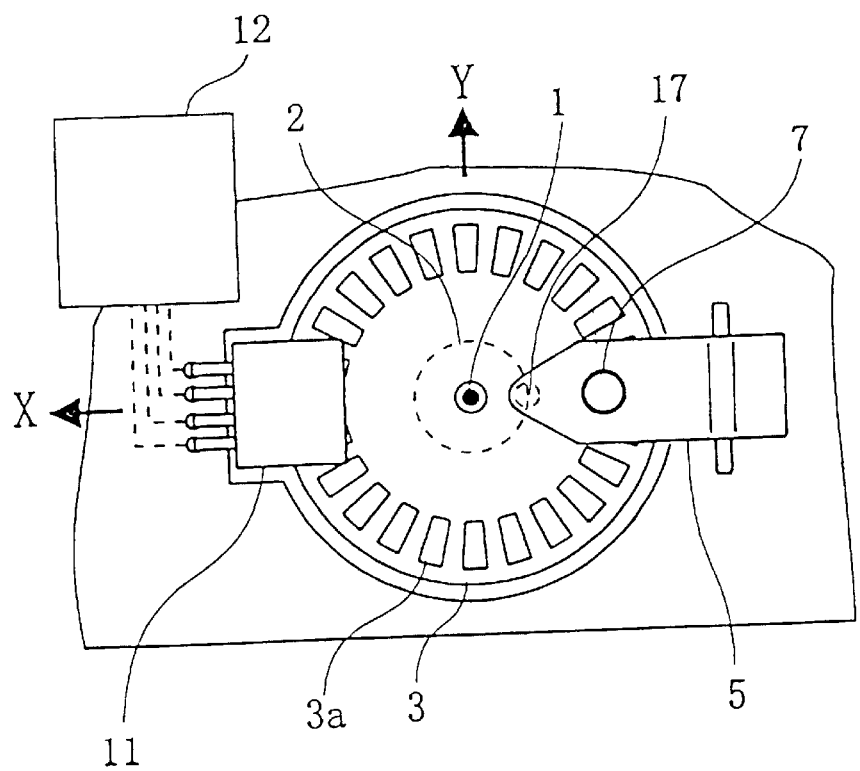
FIG. 1B is a plan view explaining an internal construction of the embodiment of FIG. 1.

Referring to the accompanying drawings, embodiments of the present invention will be described below. FIGS. 1A and 1B show an internal construction and a principle of one embodiment of a mouse having installed therein a moving position detector according to the present invention. FIG. 1A is a sectional view of the moving position detector according to the present invention, and FIG. 1B is a plan view thereof in which an upper plate 15 of a main body is removed for the sake of clarification of the internal construction. In FIG. 1A, the main body upper plate 15 and a main body lower plate 14 are secured to each other or formed integral with each other so as to form an integral main body container.

A shaft 1 is fixed to the main body upper plate 15 in such a manner that it is oriented normal to a floor surface 18 when it is operated. A rotating body 2 rotates around the shaft 1, and a bottom 4 of the rotating body 2 is exposed through an opening in the main body lower plate 14 in such a manner as to be brought into contact with the floor surface 18. The rotating body 2 is fitted over the shaft 1 in such a manner that a certain"gap" is maintained in a vertical direction and between the shaft 1 and a corresponding bore formed in the central hub portion of the rotating body 2.

A pressurizing point 17 that is pressed by a lever 5 is provided on an upper floor surface of the rotating body 2. Due to this construction, and with respect to pressures between the rotating body 2 and the floor surface 18, a pressure applied to a point 4a close to the pressurizing point 17 becomes larger, while a pressure applied to a point 4c far away from the pressurizing point 17 becomes lower. In addition, the lever presses against the rotating body 2 via a spring 7 at the pressurizing point 17, and there is caused a difference in pressure at the respective points 4a, 4b, 4c on the bottom 4 of the rotating body. Normally, since this pressing down pressure does not need to be large, gravity alone acting on the lever 5 is all that has to be used, meaning that the spring 7 is not necessarily used.

At this time, since the friction coefficient is identical over the bottom 4, there is caused a difference in frictional force between the bottom 4 and the floor surface 18. When the main body lower plate 14 is moved in a Y direction, the frictional force at the point 4a becomes greater than that at the point 4c. This produces a moment, whereby in FIG. 1B, the rotating body 2 and the rotary encoder 3 are rotated in a clockwise direction.

On the other hand, in a case where the main body lower plate 14 is moved in an X direction, the difference in frictional force is symmetrical relative to the moving direction, and this produces no moment. Therefore, the rotating body 2 does not rotate. Thus, with the moving position detector according to the present invention, only the moving distance in a direction normal to the line connecting the shaft 1 and the pressurizing point 17 causes the rotating body 2 to perform rotating movements.

Figure 2:
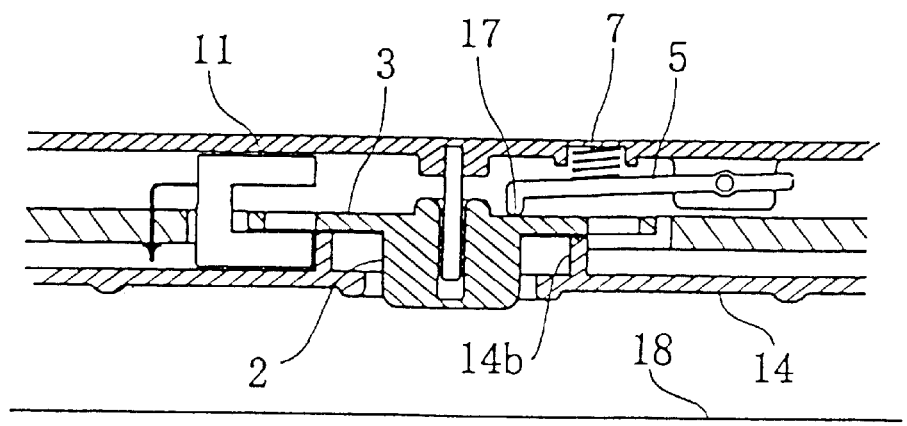
FIG. 2 is a sectional view showing a state, in which a moving position detector according to the present invention is lifted, which is shown in section.

FIG. 2 is a sectional view showing a state in which the moving position detector shown in FIG. 1 is lifted from the floor surface 18. When the moving position detector is lifted, the rotating body 2 is pressed down by gravity and the pressure applied by the pressurizing point 17, and the rotary encoder as a part of the rotating body 2 is brought into contact with a rib 14b of the main body lower plate 14 or the rotation detecting means 11 to put a brake on rotation. Due to this, as with the conventional mouse, when the main body lower plate 14 is lifted, the cursor stops on the screen.

The rotary encoder 3 is constructed so as to be integral with the rotating body 2 or fixed thereto, and rotates as the rotating body 2 rotates. It has marks 3a arranged in a radial fashion on an outer circumference thereof for use in conversion. In a normal case, the mark 3a takes the form of a slit, and the shutter effect of the marks 3a is detected by an illuminating means and a photosensor of the rotation detector 11.

In addition, conventional methods can be used. For instance, magnetic stripes may be used as the mark 3a and a magnetic sensor may be used in the rotation detecting means 11.

Figure 3:
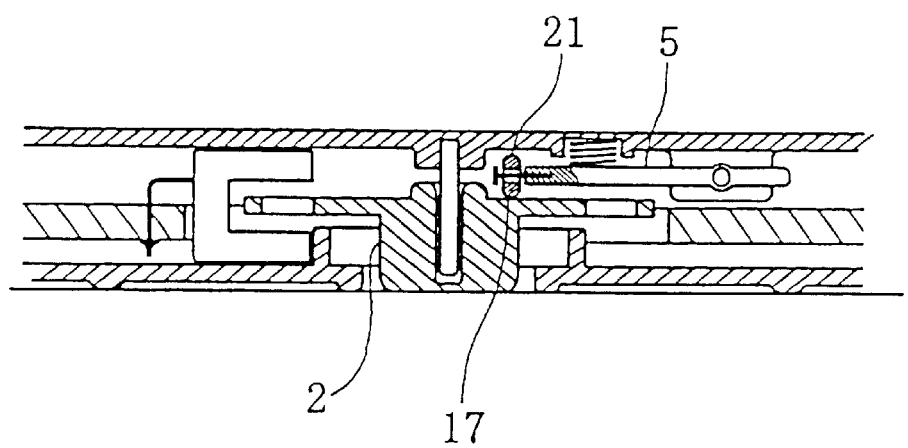
FIG. 3 is a sectional view showing another of the present invention in which a roller is used.

FIG. 3 shows an example in which a friction reducing roller 21 is used at a position on the lever 5 corresponding to the pressurizing point 17 in the moving position detector shown in FIG. 1 or FIG. 2, whereby the frictional force acting between the lever 5 and the rotating body 2 is reduced. With the moving position detector according to the present invention, since only the difference in frictional force between the bottom 4 of the rotating body 2 and the floor surface 18 is used, it is good that frictional forces produced at other locations of the device are low. The friction-reducing roller 21 is used for this purpose.

Figure 4:
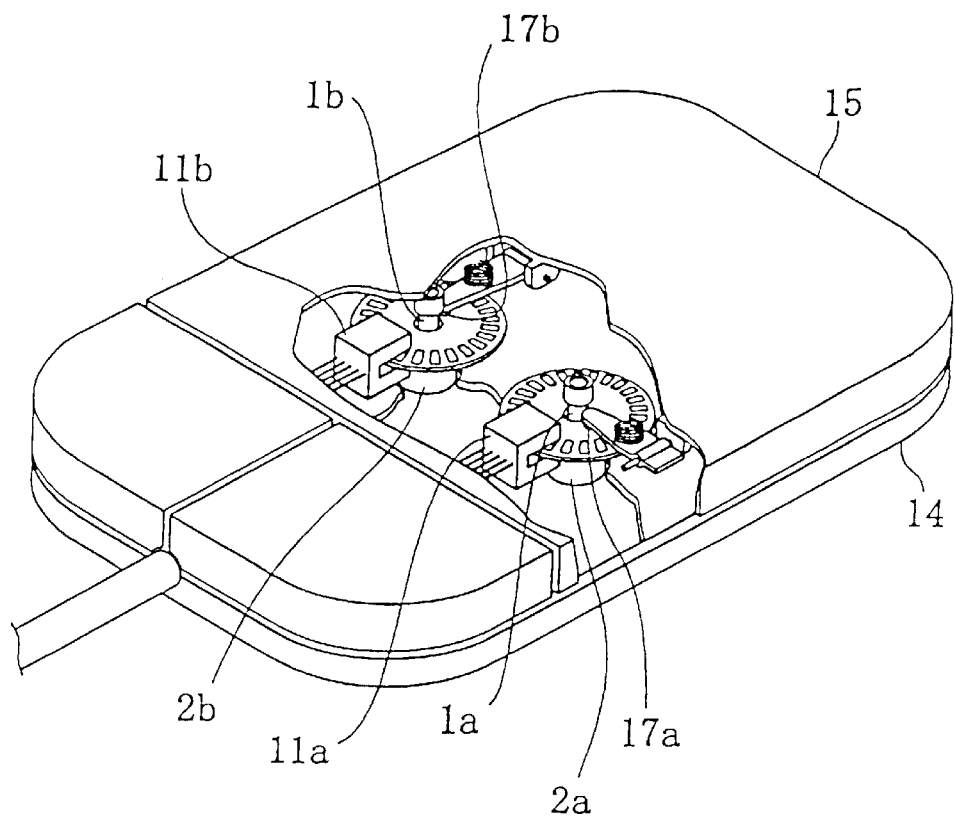
FIG. 4 is a perspective view showing in partial section a state in which the present invention is incorporated in a mouse.

FIG. 4 is an explanatory view showing an example in which the moving position detector shown in FIG. 1 or FIG. 2 is used in a mouse. For the sake of explanation of an internal construction, the main body upper plate 15 and the main body lower plate 14 are partially cut away. In a case where the present invention is applied to a mouse, there are used two moving position detectors. As shown in FIG. 4, when a pressurizing point 17 of one of the moving position detectors is disposed at a position normal to a longitudinal direction in which the mouse is moved as viewed from a shaft 1a, while a pressurizing point 17 of the other moving position detector is disposed at a position normal to a lateral direction in which the mouse is moved as viewed from a shaft 1b, constituent members including rotation detecting means 11a, 11b c can be replaced with those that are used in a conventional ball-type mouse. In this embodiment, the rotation detecting means 11 a detects longitudinal movements, while the rotation detecting means 11b detects lateral movements. The locations of the respective moving position detecting devices are not limited to those shown in FIG. 4, but they may be located on any position on the main body lower plate 14 provided that the angle of the respective pressurizing points is maintained at right angles relative to the longitudinal and lateral directions and that the bottom 4 is in contact with the floor surface 18.

Figure 5:
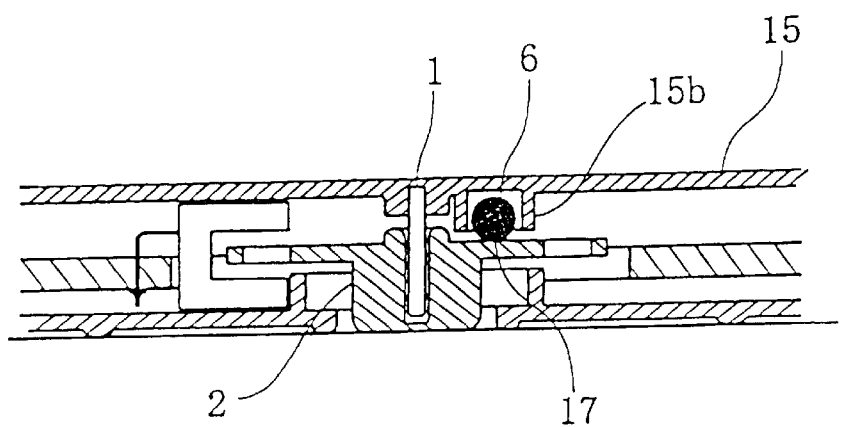
FIG. 5 is a sectional view showing a farther embodiment of the present invention, in which a ball is used.

FIG. 5 shows an example in which a ball 6 is used to pressurize the pressurizing point 17 in the moving position detector shown in FIG. 1 or FIG. 2, the ball 6 being positioned by means of a cylindrical ball guide 15b on the main body upper plate 15 and adapted to freely roll within a range determined by the guide. Using a method like this, it is possible to reduce frictional forces on mechanism portions and improve the accuracy in position detection.

Figure 6:
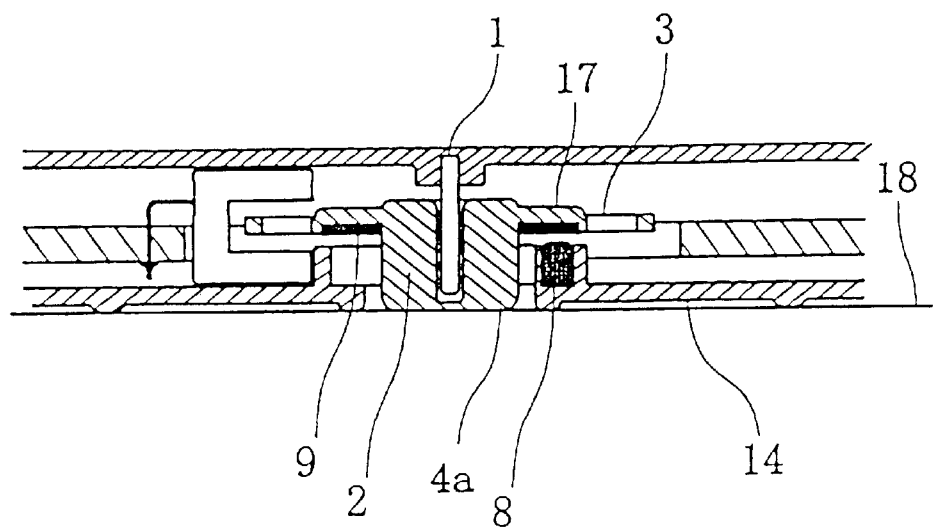
FIG. 6 is a sectional view showing another embodiment of the present invention, in which a magnet is used.

FIG. 6 shows an example in which a magnetic force is used to load the pressurizing point 17 in order to reduce the frictional force acting on mechanism portions of the device. A ring 9 fixed to a rotating body 2 is formed from a material which is attracted by nature a magnet, and is designed to load the bottom 4 of the rotating body 2 in an unsymmetrical fashion relative to a shaft 1 by a magnet 8, whereby the frictional force against the floor surface 18 is increased at the point 4a.

In FIG. 6, what is important is the attraction between the magnet 8 and the ring 9, and in order to obtain a similar effect, the ring 9 may be formed of magnet or the rotating boy 2 and the rotary encoder 3 themselves may be formed of magnet or a material that is attracted by nature by a magnet, so that they are directly attracted by the magnet 8.

Figure 7A:
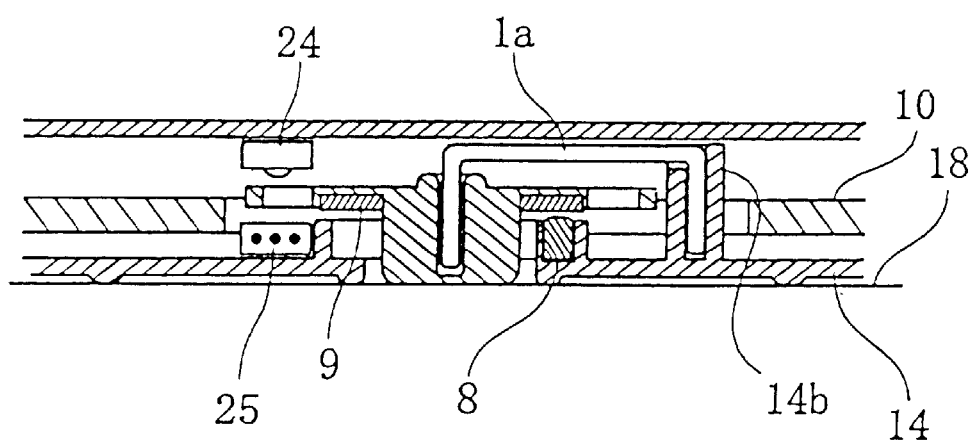
FIG. 7A is a sectional view showing an illustrative example of the embodiment shown in FIG. 6.
Figure 7B:
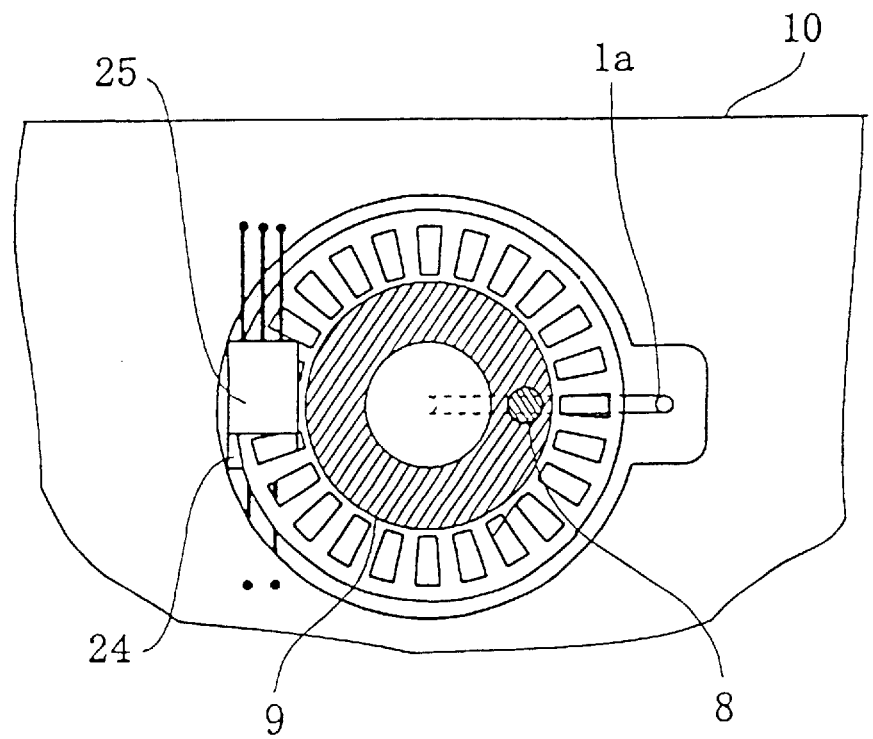
FIG. 7B is a plan view of the embodiment of FIG. 7A.

FIGS. 7A and 7B show modified examples of the shaft 1 and the rotation detecting means 11. The shaft 1 is not necessarily fixed to the main body upper plate 15 as shown in the previous embodiments, but as long as it can hold the rotating body 2 perpendicularly to the floor surface 18, as shown in FIG. 7, a bent shaft 1a may be used and fixed by a boss 4b of the main body lower body 14.

In addition, in the previous embodiments, the rotation detecting means 11 has been explained as an integral member, but in practical application of the device to a mouse, a detecting means is generally used in which the shutter effect of the marks 3a, which are actually slits, is detected by an illumination means 24 and a photosensor 25. In this case, as shown in FIG. 7A and FIG. 7B, if they are alternately faced each other, they can easily be disposed on the base plate 10.

Figure 8:
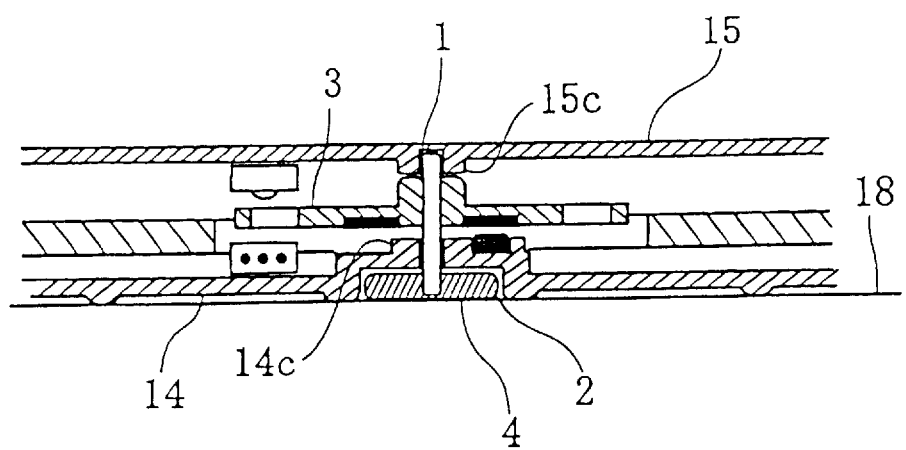
FIG. 8 is a sectional view showing another embodiment of the present invention.
Figure 9:
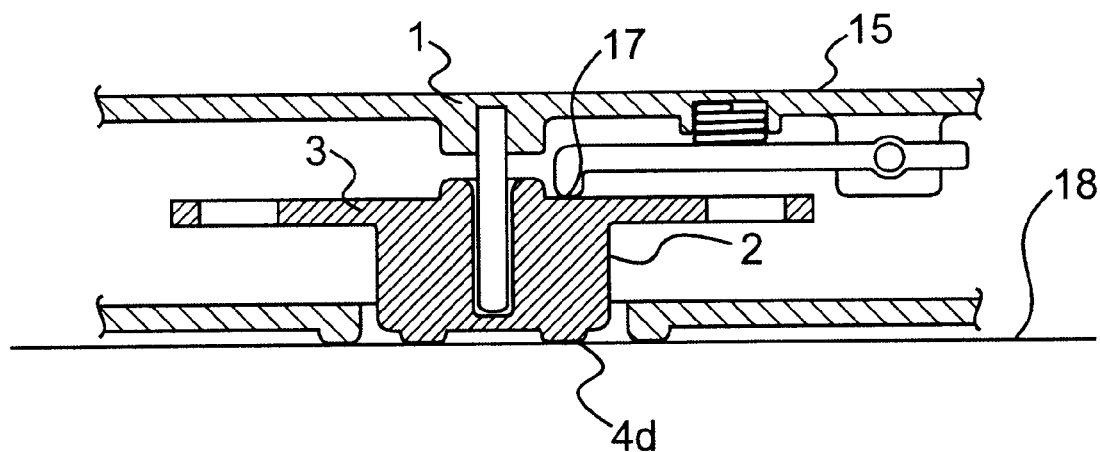
FIG. 9 is a sectional view showing a further embodiment of the present invention.
Figure 10:
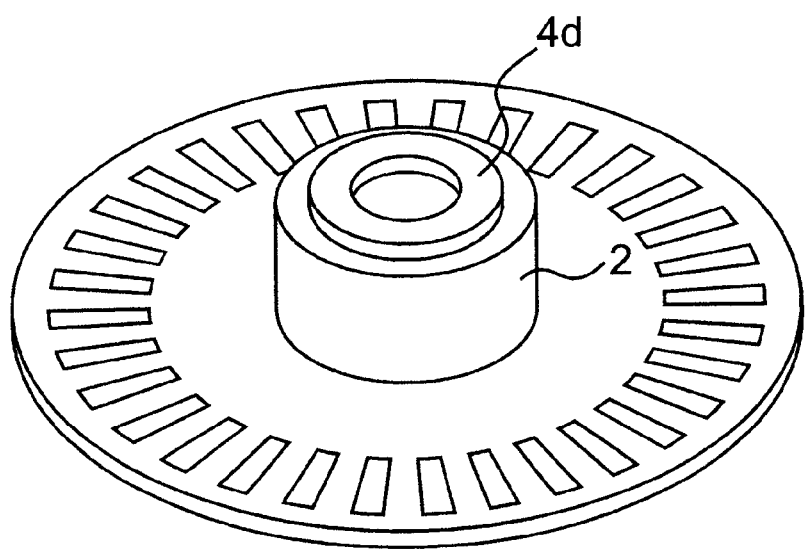
FIG. 10 is a perspective view showing the configuration of the constituent elements shown in FIG. 9.

Furthermore, in the previous embodiments, a method is introduced in which the shaft 1 is fixed and rotated around a hole in the rotating body 2, but as shown in FIG. 8, a similar effectiveness may be obtained if the rotating body 2 and the rotary encoder portion 3 are fixed to the shaft 1 and are held by a bearing portion 14c of the main body lower plate 14 and a bearing portion 15c of the main body upper plate 15. FIG. 9 is a sectional view showing another embodiment, and FIG. 10 shows a configuration of a rotating body shown in FIG. 9 and is a perspective view of the rotating body as viewed from the bottom thereof. In the previous embodiments, the bottom of the rotating body 2 is explained as flat, but the bottom may be a ring-like raised portion concentric with a rotating body as shown at a bottom contact portion 4d in FIGS. 9 and 10. With the bottom formed into a shape like this, since the radius between the rotation center and the contact point always is maintained nearly constant, the rotation of the rotating body 2 and rotary encoder portion 3 relative to a main body 15 becomes stable. In addition, if the contact floor surface diameter or contact circumferential diameter of the bottom floor surface portion 4d of this embodiment is made smaller, the number of rotations of the rotating body 2 relative to the moving distance of the main body 15 of the rotating body 2 becomes larger, thus making it possible to set a sensitivity thereof in accordance with operation conditions.

Figure 11:
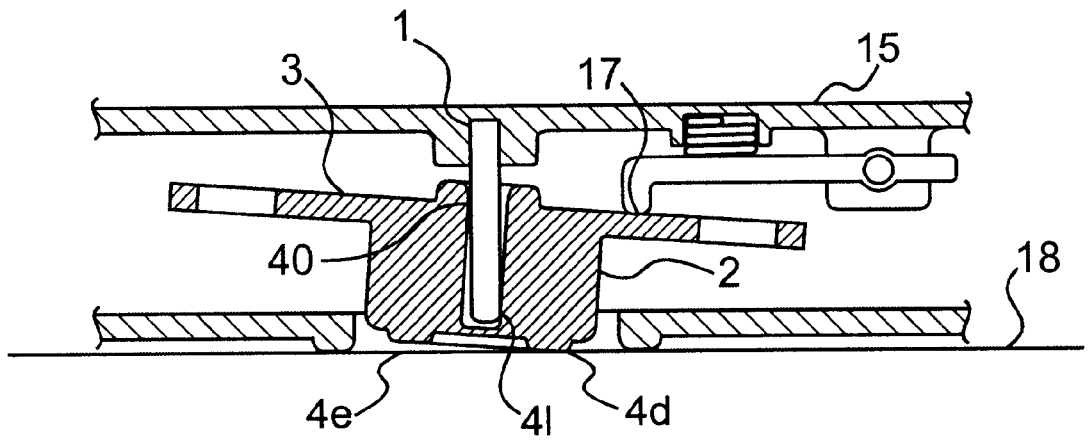
FIG. 11 is a sectional view showing another embodiment of the present invention.

FIG. 11 is a sectional view showing an example of an operating state when the pressurizing point 17 resides outwardly of the circumference of the bottom contact portion 4d. With the pressurizing point 17 being disposed outside or inside the circumference of the bottom contact portion 4d, if the pressure is low, the moving position detector according to the present invention operates in a state as shown in FIG. 9, but with the pressurizing point residing outside the bottom contact portion 4d, in a case where the pressure is great enough to fall down the rotating shaft 2, the rotating body 2 is slightly inclined within a range of the looseness of the shaft supporting hole in the rotating body 2, a point 4e located on an opposite side of the bottom contact portion 4d is slightly raised from the floor surface 18 to a floating state as shown in FIG. 11. In this case, if the pressure at the pressurizing point 17 is not too large and remains within a range such that the resistance generated by the frictional force at upper and lower contact portions 40, 41 caused between the supporting shaft 1 and the shaft hole in the rotating body by virtue of the pressure from the pressurizing point 17 does not exceed a rotating moment produced by virtue of the frictional force generated between the bottom contact portion 4d and the floor surface 18, the rotating body can provides rotations similar to those provided thereby in the previous embodiments in a state as shown in FIG. 11. The same thing can be said when the floor surface 18 is completely flat, and slight irregularities on the floor surface 18 may be absorbed in a state shown in this embodiment if they fall within a range of the looseness between the supporting shaft 1 and the shaft receiving hole.

Figure 12:
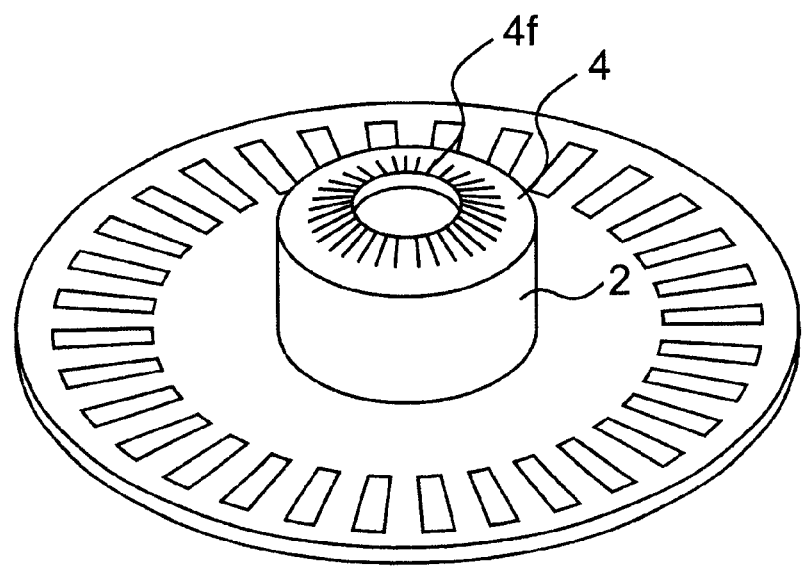
FIG. 12 is a perspective view showing a further embodiment of the present invention.

FIG. 12 is a perspective view showing another embodiment as to the configuration of the bottom 4 of the rotating body 2. As shown in FIG. 12, the bottom 4 of the rotating body 2 may be formed into a conical shape or similarly, a spherical shape. In addition, raised line-like configuration 4f may be applied to the contact portion of the bottom 4, so that the frictional forces in the XY directions generated during operation can be differentiated to thereby improve the sensitivity.

Figure 13:
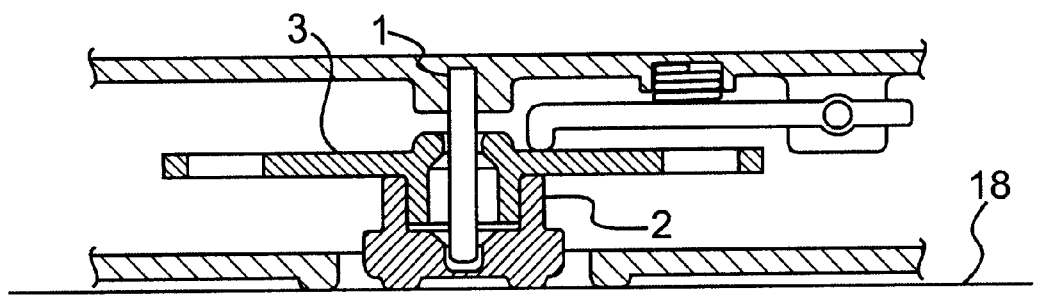
FIG. 13 is a sectional view showing another embodiment of the present invention.
Figure 14:
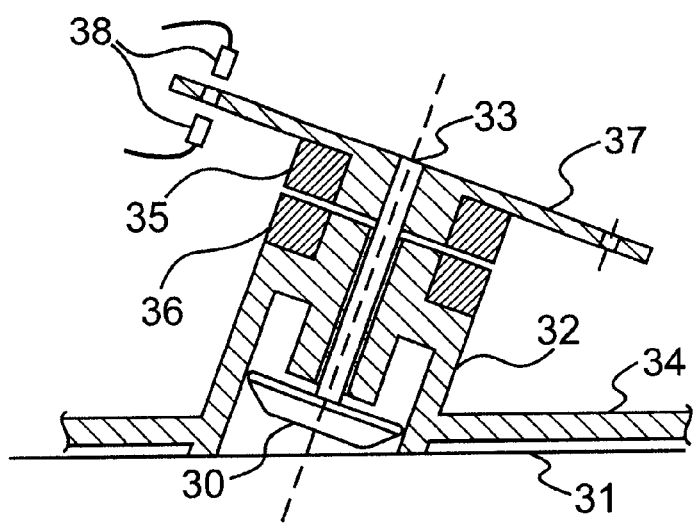
FIG. 14 is a section view of a device of conventional design.

FIG. 13 is a sectional view showing an example in which the rotating body 2 and the rotary encoder portion 3 are made to be separate parts. In this case, a construction as shown in FIG. 13 may be possible provided that the rotating boy 2 and the rotary encoder portion 3 are fixed by virtue of the frictional force generated at the fitting portion or bonding so as to move together. With this construction, the shaft hole in the rotating body 2 or the rotary encoder portion 3 do not have to be elongated, thus facilitating the production of respective constituent components.

The present invention is effected in the forms described heretofore, and provides the following effectiveness. With the mouse using the moving position detector according to the present invention, an equivalent function can be obtained with fewer constituent components when compared with a conventional mouse. Since the present invention uses the vertical shaft, the production process becomes simple, reducing the production costs.

In addition, with the present invention, the rotating body and the rotary encoder can be disposed horizontally relative to the perpendicular shaft, this resulting in a thinner configuration, thereby making it possible to provide a mouse convenient of carrying.

Furthermore, with the present invention, there is no risk of taking up dust on the floor surface, which often happens with a conventional mouse when it rolls, and therefore the maintenance work during usage can be alleviated.

The foregoing description is provided to illustrate the invention and is not to be construed as a limitation. Numerous additions, substitutions and other changes can be made to the invention without departing from its scope as set forth herein.

What is claimed is:

1. A moving position detector for a coordinate input device for use in inputting a position on a display of a display device for an information processor unit, comprising:
   a first rotating body adapted to rotate around a first shaft normal to a floor surface in contact with the device during use, and being concentric with said first shaft and placed such that a bottom thereof is brought into contact with said floor surface;
   means for applying a load to a pressurizing point located at a position spaced from a center of said bottom, wherein the means for applying a load includes a lever;
   a rotary encoder portion adapted to rotate together with said rotating body;
   a friction reducing roller provided on said lever at a portion where said lever contacts said rotating body;
   rotation detecting means for detecting the number of rotations of said rotary encoder portion; and
   output means for outputting a signal corresponding to an output from said rotation detecting means.

2. A moving position detector according to claim 1, further comprising a second rotating body adapted to rotate around a second shaft normal to a floor surface, and being concentric with said second shaft and placed such that a bottom thereof is brought into contact with said floor surface, wherein pressurizing points of said first rotating body and said second rotating body are disposed on said floor surface, when operated, at positions substantially normal to each other such that one of said pressurizing points is disposed in a longitudinal direction relative to the respective shafts of each rotating body, while the other is disposed in a lateral direction.

3. A moving position detector according to claim 1, further comprising spring means for urging the lever into engagement with the rotating body.

4. A moving position detector according to claim 1, wherein said rotating body and said rotary encoder portion are fixed to said shaft, wherein said shaft is held by one of a bearing on a lower plate of a main body and a bearing on an upper plate of said main body, with said rotating body being brought into contact with said floor surface at said bottom thereof.

5. A moving position detector for a coordinate input device for use in inputting a position on a display of a display device for an information processor unit, comprising:
   a rotating body adapted to rotate around a shaft normal to a floor surface in contact with the device during use, and being concentric with said shaft and placed such that a bottom thereof is brought into contact with said floor surface;
   means for applying a load to a pressurizing point located at a position spaced from a center of said bottom, wherein the load applying means comprises a lever;
   a friction reducing roller provided on said lever at a portion where said lever contacts said rotating body;
   a rotary encoder portion adapted to rotate together with said rotating body;
   rotation detecting means for detecting the number of rotations of said rotary encoder portion; and
   output means for outputting a signal corresponding to an output from said rotation detecting means.

6. A moving position detector for a coordinate input device for use in inputting a position on a display of a display device for an information processor unit, comprising:
   a first rotating body adapted to rotate around a first shaft normal to a floor surface in contact with the device during use, and being concentric with said first shaft and placed such that a bottom thereof is brought into contact with said floor surface;
   means for applying a load to a pressurizing point located at a position spaced from a center of said bottom, wherein the means for applying a load includes a ball;

a rotary encoder portion adapted to rotate together with said rotating body;

rotation detecting means for detecting the number of rotations of said rotary encoder portion; and output means for outputting a signal corresponding to an output from said rotation detecting means.

7. A moving position detector according to claim 6, further comprising:

a pair of rotating bodies, wherein pressurizing points of said rotating bodies are disposed on said floor surface, when operated, at positions substantially normal to each other such that one of said pressurizing points is disposed in a longitudinal direction relative to the respective shafts of each rotating body, while the other is disposed in a lateral direction.

8. A moving position detector according to claim 6, wherein said rotating body and said rotary encoder portion are fixed to said shaft, wherein said shaft is held by one of a bearing on a lower plate of a main body and a bearing on an upper plate of said main body, with said rotating body being brought into contact with said floor surface at said bottom thereof.

* * * * *